US007853594B2

(12) United States Patent
Elder et al.

(10) Patent No.: US 7,853,594 B2
(45) Date of Patent: Dec. 14, 2010

(54) SYSTEM AND METHOD FOR DETERMINING FOUNDERS OF AN INFORMATION AGGREGATE

(75) Inventors: Michael D. Elder, Greer, SC (US); Jason Y. Jho, Raleigh, NC (US); Vaughn T. Rokosz, Newton, MA (US); Matthew Schultz, Ithaca, NY (US)

(73) Assignee: International Business Machines Corporation, Armonk, NY (US)

( * ) Notice: Subject to any disclaimer, the term of this patent is extended or adjusted under 35 U.S.C. 154(b) by 150 days.

(21) Appl. No.: 10/286,211

(22) Filed: Oct. 31, 2002

(65) Prior Publication Data
US 2004/0088303 A1 May 6, 2004

(51) Int. Cl.
*G06F 7/00* (2006.01)

(52) U.S. Cl. .................. 707/738; 707/740; 707/748; 707/750

(58) Field of Classification Search ............... 707/1–10, 707/200–205, 522, 738, 740, 748, 750; 705/1
See application file for complete search history.

(56) References Cited

U.S. PATENT DOCUMENTS

| 4,908,761 | A | 3/1990 | Tai | 364/401 |
|---|---|---|---|---|
| 5,371,673 | A | 12/1994 | Fan | 364/419.01 |
| 5,745,113 | A | 4/1998 | Jordan et al. | 345/349 |
| 5,933,818 | A | 8/1999 | Kasravi et al. | 706/12 |
| 6,006,223 | A | 12/1999 | Agrawa et al. | 707/5 |
| 6,018,734 | A | 1/2000 | Zhang et al. | 707/3 |
| 6,070,143 | A | 5/2000 | Barney et al. | 705/8 |
| 6,115,718 | A | 9/2000 | Huberman et al. | 707/102 |
| 6,138,128 | A | 10/2000 | Perkowitz et al. | 707/501 |
| 6,148,294 | A | 11/2000 | Beyda et al. | 707/1 |
| 6,177,932 | B1 | 1/2001 | Galdes et al. | 345/733 |
| 6,182,067 | B1 | 1/2001 | Presnell et al. | 707/5 |
| 6,195,657 | B1 | 2/2001 | Rucker et al. | 707/5 |
| 6,199,067 | B1 | 3/2001 | Geller | 707/10 |

(Continued)

FOREIGN PATENT DOCUMENTS

JP        2001119403 A        4/2001

(Continued)

OTHER PUBLICATIONS

Brouillette, S. M. and J. P. Lavelle. *A Methodology for Mapping and Analyzing Community Social Services as a System*.Norcross, 6th Industrial Engineering Research Conference Proceedings. Miami Beach, May 17-18, 1997. Institute of Industrial Engineers, Norcross, GA, 1997. 662-667.

(Continued)

*Primary Examiner*—Charles Rones
*Assistant Examiner*—Mellissa M Chojnacki
(74) *Attorney, Agent, or Firm*—Holland & Knight LLP; Brian J Colandreo, Esq.; V. Raman Bharatula

(57) ABSTRACT

A knowledge Management (KM) tool that allows persons in an organization to more rapidly locate the people and information they need to answer their questions. Identification and visualization of information aggregate founders, including category creators, helps in locating expertise, and additionally helps to reveal and magnify hidden knowledge dynamics within the organization.

18 Claims, 6 Drawing Sheets

U.S. PATENT DOCUMENTS

| | | | |
|---|---|---|---|
| 6,212,494 B1 | 4/2001 | Boguraev | 704/9 |
| 6,216,098 B1 | 4/2001 | Clancy et al. | 703/6 |
| 6,233,583 B1 | 5/2001 | Hoth | 707/102 |
| 6,249,779 B1 | 6/2001 | Hitt | 706/1 |
| 6,266,649 B1 | 7/2001 | Linden et al. | 705/26 |
| 6,275,820 B1 | 8/2001 | Navin-Chandra et al. | 707/3 |
| 6,334,127 B1 | 12/2001 | Bieganski et al. | 707/5 |
| 6,363,174 B1 | 3/2002 | Lu | 382/209 |
| 6,594,673 B1* | 7/2003 | Smith et al. | 707/104.1 |
| 2002/0035593 A1 | 3/2002 | Salim et al. | 709/202 |
| 2002/0049792 A1* | 4/2002 | Wilcox et al. | 707/522 |
| 2002/0062302 A1* | 5/2002 | Oosta | 707/1 |
| 2002/0116399 A1* | 8/2002 | Camps et al. | 707/200 |
| 2002/0116466 A1* | 8/2002 | Trevithick et al. | 709/206 |
| 2002/0198866 A1* | 12/2002 | Kraft et al. | 707/3 |
| 2003/0126136 A1* | 7/2003 | Omoigui | 707/10 |
| 2004/0059705 A1* | 3/2004 | Wittke et al. | 707/1 |
| 2005/0004891 A1* | 1/2005 | Mahoney et al. | 707/3 |

FOREIGN PATENT DOCUMENTS

| | | |
|---|---|---|
| WO | WO 0137162 A2 | 5/2001 |
| WO | WO0201455 A2 | 2/2002 |

OTHER PUBLICATIONS

Sack, W. *Conversation Map: a content-based Usenet newsgroup browser.* Proceedings of the 2000 International Conference on Intelligent User Interfaces. ACM Press. 233-240.

Kaugers, K. *Integrated multi scale text retrieval visualization.* Conference on Human Factors and Computing Systems, Proceeedings of the Conference on CHI 98 Summary: Human Factors in Computing Systems, ISBN: 1-58113-028-7 ACM Digital Library, 1998. 307-308.

Feldman, R. *Mining unstructured data.* Tutorial notes for ACK SIGKDD 1999. ACM Press. 182-236.

Sack, W. *Diagrams of Social Cohesion.* Association for Computational Linguistics, U of Maryland. MIT Media Laboratory, Jun. 1999. 3 plus 8 pages.

Kautz, H., B. Selman, M. Shah.. *Referral Web: Combining Social Networks and Collaborative Filtering.* Communications of the ACM, vol. 40, No. 3, Mar. 1997.

Schwartz, M. F., D. C. M. Wood. *Discovering shared interests using graph analysis.* Communications of the ACM, v. 36 n. 8 Aug. 1993. 78-89.

Wellman, B. *For a social network analysis of computer networks: a sociological perspective on collaborative work and virtual community.* Proceedings of the 1996 conference on ACM SIGCPR/SIGMIS. 1-11.

Qureshi, S. *Supporting electronic groupprocesses: a social perspective.* Proceedings of the 1995 ACM SIGCPR Conference on Supporting teams, groups, and learning inside the IS function. ACM Press. 24-34.

Ackerman, M.S., B. Starr. *Social activity indicators: interface components for CSCW systems.* Proceedings of the 8th ACM Symposium on User Interface and Software Technology. ACM Press. 159-168.

Garton, L., C. Haythornthwaite, B. Wellman. *Studying on-line social networks* in Doing Internet Research, edited by Steve Jones, Thousand Oaks, CA: Sage, 1999.

Srivastava, Jaidepp, Robert Cooley, Mukund Deshpande, Pang-Ning Tan. *Web Usage Mining: Discovery and Applications of Usage Patterns from Web Data.* SIGKDD Explorations, vol. 1, Issue 2. Jan. 2000. 12-23.

Wang, Y. *Web Mining and Knowledge Discovery of Usage Patterns.* CS748T Project (Part I) Feb. 2000.

* cited by examiner

XML FORMAT FOR SQL QUERIES

QRML STRUCTURE

SYSTEM AND METHOD FOR DETERMINING FOUNDERS OF AN INFORMATION AGGREGATE

RELATED APPLICATIONS

The following U.S. patent applications are filed concurrently herewith and are assigned to the same assignee hereof and contain subject matter related, in certain respect, to the subject matter of the present application. These patent applications are incorporated herein by reference.

Ser. No. 10/286,211, filed Oct. 31, 2002 for "SYSTEM AND METHOD FOR DETERMINING FOUNDERS OF AN INFORMATION AGGREGATE", Ser. No. 10/286,263, filed Oct. 31, 2002 for "SYSTEM AND METHOD FOR FINDING THE ACCELERATION OF AN INFORMATION AGGREGATE", Ser. No. 10/286,262, filed Oct. 31, 2002 for "SYSTEM AND METHOD FOR FINDING THE RECENCY OF AN INFORMATION AGGREGATE", Ser. No. 10/286,261, filed Oct. 31, 2002 for "SYSTEM AND METHOD FOR EXAMINING THE AGING OF AN INFORMATION AGGREGATE", Ser. No. 10/286,212, filed Oct. 31, 2002 for "SYSTEM AND METHOD FOR DETERMINING CONNECTIONS BETWEEN INFORMATION AGGREGATES", Ser. No. 10/286,237, filed Oct. 31, 2002 for "SYSTEM AND METHOD FOR DETERMINING MEMBERSHIP OF INFORMATION AGGREGATES", Ser. No. 10/286,508, filed Oct. 31, 2002 for "SYSTEM AND METHOD FOR EVALUATING INFORMATION AGGREGATES BY VISUALIZING ASSOCIATED CATEGORIES", Ser. No. 10/286,145, filed Oct. 31, 2002 for "SYSTEM AND METHOD FOR DETERMINING COMMUNITY OVERLAP", Ser. No. 10/285,799, filed Oct. 31, 2002 for "SYSTEM AND METHOD FOR BUILDING SOCIAL NETWORKS BASED ON ACTIVITY AROUND SHARED VIRTUAL OBJECTS", and Ser. No. 10/286,534, filed Oct. 31, 2002 for "SYSTEM AND METHOD FOR ANALYZING USAGE PATTERNS IN INFORMATION AGGREGATES".

BACKGROUND OF THE INVENTION

1. Field of the Invention

This invention relates to a method and system for analyzing trends in an information aggregate. More particularly, it relates to identifying and visualizing founders of such an aggregate.

2. Background

Corporations are flooded with information. The Web is a huge and sometimes confusing source of external information which only adds to the body of information generated internally by a corporation's collaborative infrastructure (e-Mail, Notes databases, QuickPlaces, and so on). With so much information available, it is difficult to determine what information is sufficiently important to access. In fact, it is so difficult to search through all of this information that individuals looking for information will often rely on the people around them for help, rather than spend time struggling with computer-based search engines. If a person is known to have expertise in a particular area, the individual looking for information will simply call that expert and ask questions, and so find their answers much quicker.

A well-developed network of connections to other people, then, can improve the effectiveness of an individual. On the other hand, an individual's effectiveness can then be limited by the number of people in the network that can be easily found.

The Lotus Discovery Server (LDS) is a Knowledge Management (KM) tool that allows users to more rapidly locate the people and information they need to answer their questions. It categorizes information from many different sources (referred to generally as knowledge repositories) and provides a coherent entry point for a user seeking information. Moreover, as users interact with LDS and the knowledge repositories that it manages, LDS can learn what the users of the system consider important by observing how users interact with knowledge resources. Thus, it becomes easier for users to quickly locate relevant information.

The focus of LDS is to provide specific knowledge or answers to localized inquiries; focusing users on the documents and categories that can answer their questions. There is a need, however, to also identify people who might be able to answer questions. The LDS associates people with categories, thereby providing one way of finding people. But there is a need for additional ways to identify people who have a particular expertise.

SUMMARY

A system or method for evaluating an information aggregate by collecting a plurality of documents having non-unique values on a shared attribute into an information aggregate; and identifying and visualizing the people who first worked with documents in the aggregate (the "founders" of the information aggregate).

Other features and advantages of this invention will become apparent from the following detailed description of the presently preferred embodiment of the invention, taken in conjunction with the accompanying drawings.

DESCRIPTION OF PREFERRED EMBODIMENTS

Figure 1:
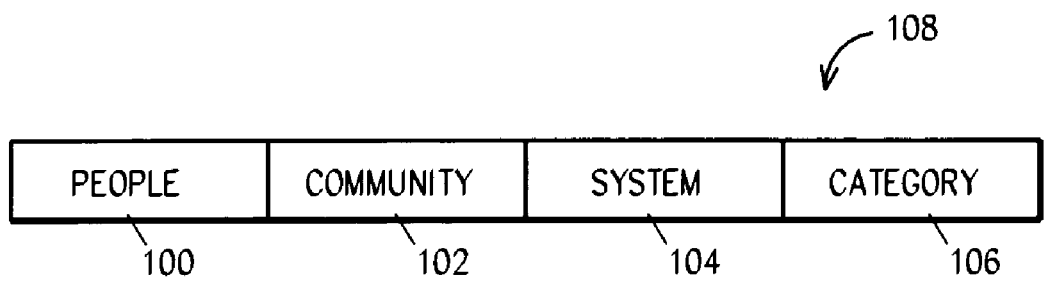
FIG. 1 is a diagrammatic representation of visualization portfolio strategically partitioned into four distinct domains in accordance with the preferred embodiment of the invention.

The Lotus Discovery Server (LDS) is a Knowledge Management (KM) tool that allows users to more rapidly locate the people and information they need to answer their questions. In an exemplary embodiment of the present invention, the functionality of the Lotus Discovery Server is extended to include useful visualizations that magnify existing trends of an aggregate system and identify relationships. Useful visualizations of knowledge metric data store by LDS are determined, extracted, and visualized for a user.

On its lowest level, LDS manages knowledge resources. A knowledge resources is any form of document that contains knowledge or information. Examples include Lotus WordPro Documents, Microsoft Word Documents, webpages, postings to newsgroups, etc. Knowledge resources are typically stored within knowledge repositories—such as Domino.Doc databases, websites, newsgroups, etc.

When LDS is first installed, an Automated Taxonomy Generator (ATG) subcomponent builds a hierarchy of the knowledge resources stored in the knowledge repositories specified by the user. For instance, a document about working with XML documents in the Java programming language stored in a Domino.Doc database might be grouped into a category named 'Home>Development>Java>XML'. This categorization will not move or modify the document, just record its location in the hierarchy. The hierarchy can be manually adjusted and tweaked as needed once initially created.

A category is a collection of knowledge resources and other subcategories of similar content. Categories represent a more abstract re-organization of the contents of physical repositories, without displacing the available knowledge resources. For instance, in the following hierarchy:

```
Home (Root of the hierarchy)
    Animals
        Dogs
        Cats
    Industry News and Analysis
        CNN
        ABC News
        MSNBC
```

'Home>Animals', 'Home>Industry News and Analysis', and 'Home>Industry News and Analysis>CNN' are each categories that can contain knowledge resources and other subcategories. Furthermore, 'Home>Industry News and Analysis>CNN' might contain documents from www.cnn.com and documents created by users about CNN articles which are themselves stored in a Domino.Doc database.

A category is one example of a more general idea: the information aggregate. An information aggregate is a collection of knowledge resources that is formed based on a set of rules used to identify the resources that should be part of the collection. For example, a category is an information aggregate that groups knowledge resources based on their content. The rules used to create information aggregates can be simple (e.g., all documents containing the keyword "Cats") or complex (e.g., all documents contained in a specified set of knowledge repositories whose authors have offices in Texas).

One useful information aggregate groups documents based on the knowledge repositories which contain them. This type of aggregate is called a "community", because knowledge repositories that are used for collaboration help to identify people who work together. In other words, a community is a set of repositories primarily utilized by some particular group of people. If a user interacts with one of the repositories used to define Community A (e.g., by creating or reading a document), then he is considered an active participant in that community.

As a user interacts with knowledge resources, LDS learns which categories they interact with the most. LDS maintains a score for the user, known as an affinity. An affinity is a rank that numerically captures how often a user interacts with a particular category compared to the level of interaction of other users. Affinities within the system are only important in relation to the other affinities. Once a user's affinity reaches a certain threshold, LDS asks the user if he would like to publish that affinity. These affinities can then be made public, so that when other users search on a topic, LDS can identify users who are knowledgeable on that topic.

These affinities are extremely useful in making inferences about the interests of the users of the system, and in understanding the knowledge trends. In accordance with exemplary embodiments of the present invention, affinities may be used to reflect when a particular category (or topic of information) becomes more important than others, indicating that the organization is losing or gaining interest in some topic, and may be used in qualifying or ranking founders.

LDS maintains a score for the knowledge resources which are utilized to indicate how important they are to the users of the system. For instance, a document that has a lot of activity around it—such as responses, modifications or simply a high access rate—is perceived as more important than documents which are rarely accessed. This is generically referred to as 'document value'.

Another capability of LDS is its search functionality. Instead of returning only the knowledge resources (documents) that a standard web-based search engine might locate, LDS also returns the categories that the topic might be found within and the people that are most knowledge about that topic. LDS takes the users' affinities and the document values it has calculated into account when returning the results of a search. Thus, users with high affinities for a particular topic and documents that are rated with a higher document value are more likely to be returned. The present invention can use the results of a search as one way of creating an information aggregate The system and method of the preferred embodiments of the invention are built on a framework that collectively integrates data-mining, user-interface, visualization, and server-side technologies. An extensible architecture provides a layered process of transforming data sources into a state that can be used by visualization components. This architecture is implemented through Java, Servlets, JSP, SQL, XML, and XSLT technology, and adheres to a model-view controller paradigm, where interface and implementation components are separated.

Referring to FIG. 1, a visualization portfolio is partitioned into four distinct domains, or explorers: people 100, community 102, system 104, and category 106. The purpose of these partitioned explorers 100-106 is to provide meaningful context for the visualizations. The raw usage pattern metrics produced from the Lotus Discovery Server (LDS) do not raise any significant value unless there is an applied context to it. In order to shed light on the hidden relationships behind the process of knowledge creation and maintenance, there is a need to ask many important questions. Who are the knowledge creators? What group of people are targeted as field experts? How are groups communicating with each other? Which categories of information are thriving or lacking activity? How is knowledge transforming through time? While answering many of these questions, four key targeted domains, or explorer types 100-106 are identified, and form the navigational strategy for user interface 108. This way, users can infer meaningful knowledge trends and dynamics that are context specific.

People Domain 100

People explorer 100 focuses on social networking, community connection analysis, category leaders, and affinity analysis. The primary visualization component is table listings and associations.

Community Domain 102

Community explorer 102 focuses on acceleration, associations, affinity analysis, and document analysis for a set of repositories identified by an administrator. The primary visualization components are bar charts and table listings. Features include drill down options to view associated categories, top documents, and top contributors.

System Domain 104

System explorer 104 focuses on high level activity views such as authors, searches, accesses, opens, and responses for documents. The primary visualization components are bar charts (grouped and stacked). Features include zooming and scrollable regions.

Category Domain 106

Category explorer 106 focuses on lifespan, acceleration, affinity analysis, and document analysis of categories generated by a Lotus Discovery Server's Automated Taxonomy Generator. The primary visualization components are bar charts. Features include drill down options to view subcategories, top documents, top contributors, category founders, and document activity.

System Overview

Figure 2:
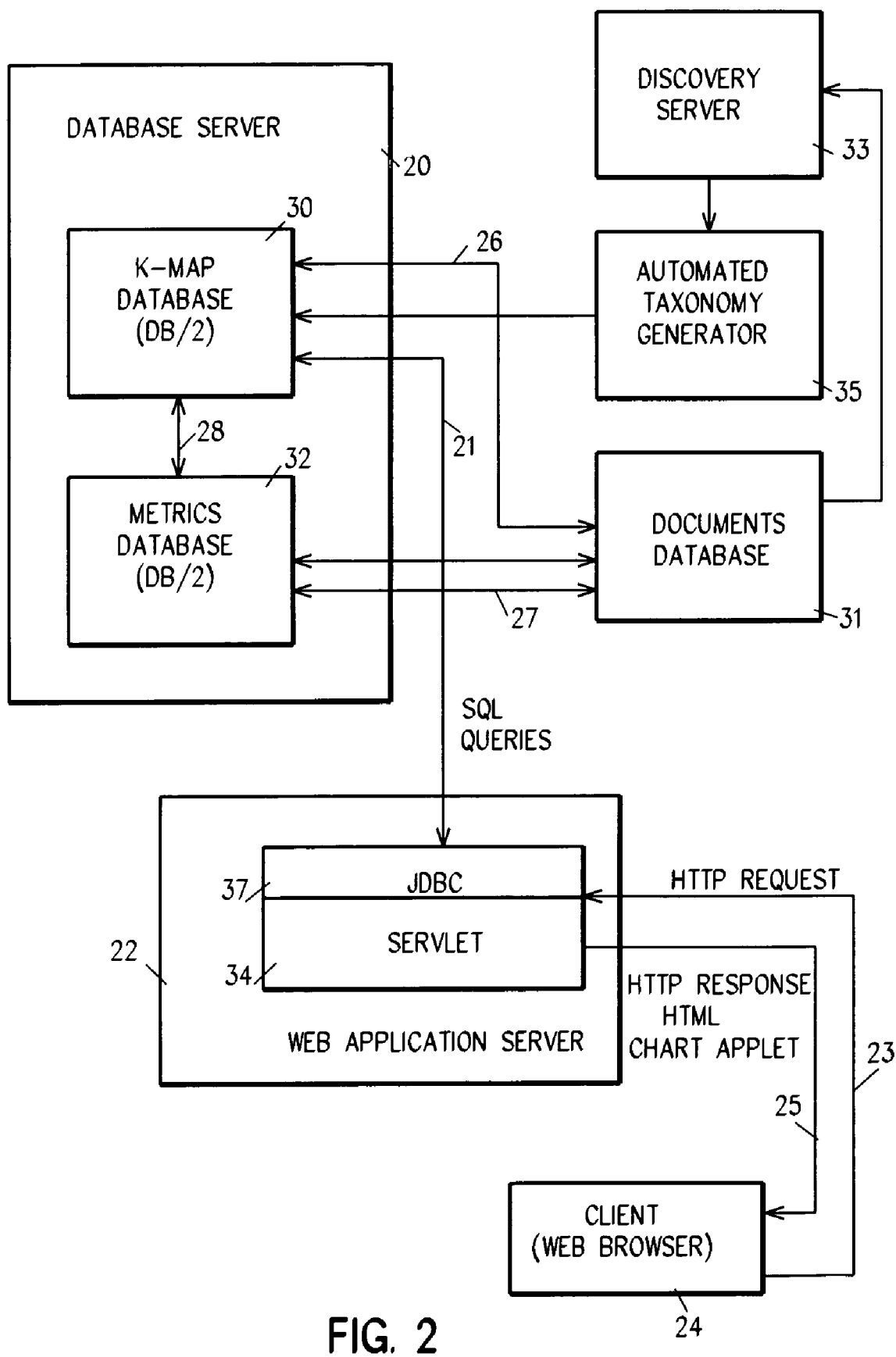
FIG. 2 is a system diagram illustrating a client/server system in accordance with the preferred embodiment of the invention.

Referring to FIG. 2, an exemplary client/server system is illustrated, including database server 20, discovery server 33, automated taxonomy generator 35, web application server 22, and client browser 24.

Knowledge management is defined as a discipline to systematically leverage information and expertise to improve organizational responsiveness, innovation, competency, and efficiency. Discovery server 33 (e.g. Lotus Discovery Server) is a knowledge system which may deployed across one or more servers. Discovery server 33 integrates code from several sources (e.g., Domino, DB2, InXight, KeyView and Sametime) to collect, analyze and identify relationships between documents, people, and topics across an organization. Discovery server 33 may store this information in a data store 31 and may present the information for browse/query through a web interface referred to as a knowledge map (e.g., K-map) 30. Discovery server 33 regularly updates knowledge map 30 by tracking data content, user expertise, and user activity which it gathers from various sources (e.g. Lotus Notes databases, web sites, file systems, etc.) using spiders.

Database server 20 includes knowledge map database 30 for storing a hierarchy or directory structure which is generated by automated taxonomy generator 35, and metrics database 32 for storing a collection of attributes of documents stored in documents database 31 which are useful for forming visualizations of information aggregates. The k-map database 30, the documents database 31, and the metrics database are directly linked by a key structure represented by lines 26, 27 and 28. A taxonomy is a generic term used to describe a classification scheme, or a way to organize and present information, Knowledge map 30 is a taxonomy, which is a hierarchical representation of content organized by a suitable builder process (e.g., generator 35).

A spider is a process used by discovery server 33 to extract information from data repositories. A data repository (e.g. database 31) is defined as any source of information that can be spidered by a discovery server 33.

Java Database Connectivity API (JDBC) 37 is used by servlet 34 to issue Structured Query Language (SQL) queries against databases 30, 31, 32 to extract data that is relevant to a users request 23 as specified in a request parameter which is used to filter data. Documents database 31 is a storage of documents in, for example, a Domino database or DB2 relational database.

The automated taxonomy generator (ATG) 35 is a program that implements an expectation maximization algorithm to construct a hierarchy of documents in knowledge map (K-map) metrics database 32, and receives SQL queries on link 21 from web application server 22, which includes servlet 34. Servlet 34 receives HTTP requests on line 23 from client 24, queries database server 20 on line 21, and provides HTTP responses, HTML and chart applets back to client 24 on line 25.

Discovery server 33, database server 20 and related components are further described in U.S. patent application Ser. No. 10,044,914 filed 15 Jan. 2002 for System and Method for Implementing a Metrics Engine for Tracking Relationships Over Time.

Figure 3:
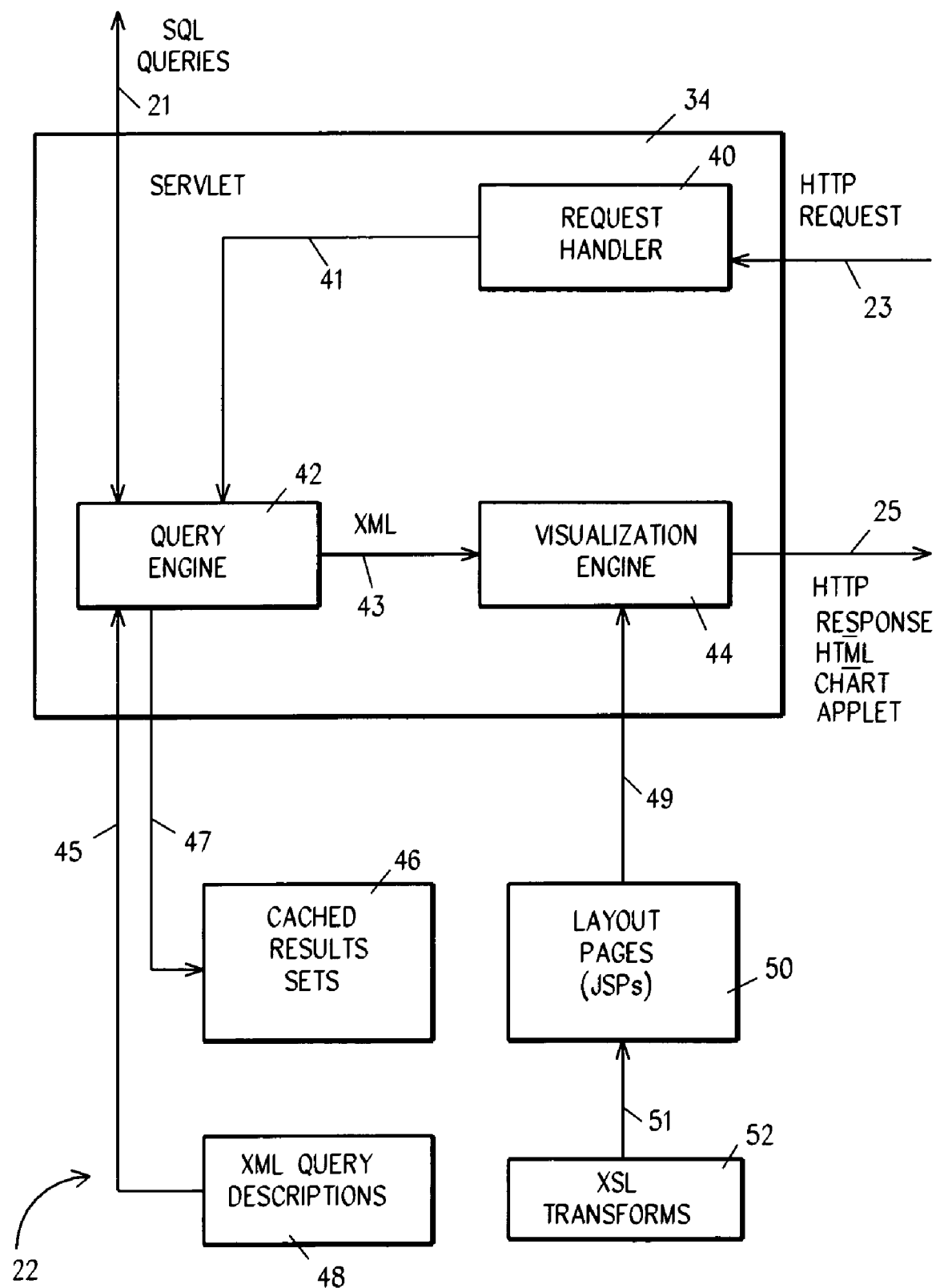
FIG. 3 is a system diagram further describing the web application server of FIG. 2.

Referring to FIG. 3, web application server 22 is further described. Servlet 34 includes request handler 40 for receiving HTTP requests on line 23, query engine 42 for generating SQL queries on line 21 to database server 20 and result set XML responses on line 43 to visualization engine 44. Visualization engine 44, selectively responsive to XML 43 and layout pages (JSPs) 50 on line 49, provides on line 25 HTTP responses, HTML, and chart applets back to client 24. Query engine 42 receives XML query descriptions 48 on line 45 and caches and accesses results sets 46 via line 47. Layout pages 50 reference XSL transforms 52 over line 51.

In accordance with the preferred embodiment of the invention, visualizations are constructed from data sources 32 that contain the metrics produced by a Lotus Discovery Server. The data source 32, which may be stored in an IBM DB2 database, is extracted through tightly coupled Java and XML processing.

Figure 4:
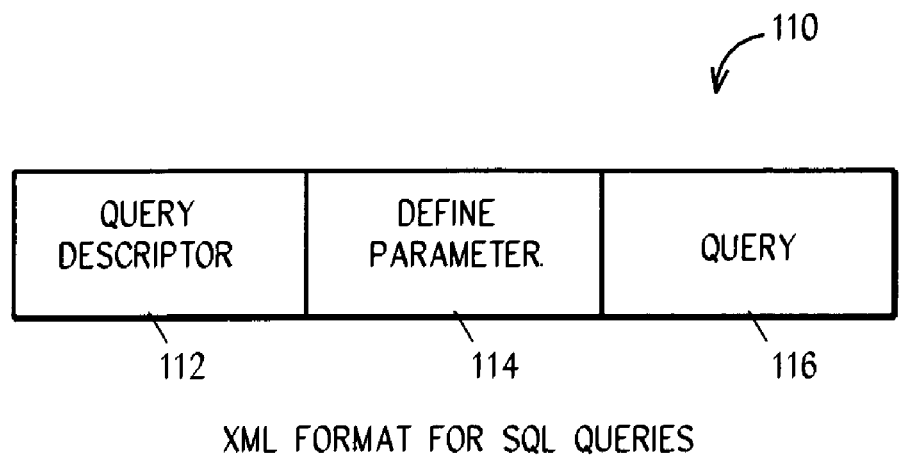
FIG. 4 is a diagrammatic representation of the XML format for wrapping SQL queries.

Referring to FIG. 4, the SQL queries 21 that are responsible for extraction and data-mining are wrapped in a result set XML format having a schema (or structure) 110 that provides three main tag elements defining how the SQL queries are executed. These tag elements are <queryDescriptor> 112, <defineParameter> 114, and <query> 116.

The <queryDescriptor> element 112 represents the root of the XML document and provides an alias attribute to describe the context of the query. This <queryDescriptor> element 112 is derived from http request 23 by request handlekr 40 and fed to query engine 42 as is represented by line 41.

The <defineParameter> element 114 defines the necessary parameters needed to construct dynamic SQL queries 21 to perform conditional logic on metrics database 32. The parameters are set through its attributes (localname, requestParameter, and defaultValue). The actual parameter to be looked up is requestParameter. The localname represents the local alias that refers to the value of requestParameter. The defaultValue is the default parameter value.

QRML structure 110 includes <query> element 116 containing the query definition. There can be one or more <query> elements 116 depending on the need for multiple query executions. A <data> child node element is used to wrap the actual query through its corresponding child nodes. The three essential child nodes of <data> are <queryComponent>, <useParameter>, and <queryAsFullyQualified>. The <queryComponent> element wraps the main segment of the SQL query. The <useParameter> element allows parameters to be plugged into the query as described in <defineParameter>. The <queryAsFullyQualified> element is used in the case where the SQL query 21 needs to return an unfiltered set of data.

Table 1 provides an example of this XML structure 110.

TABLE 1

XML STRUCTURE EXAMPLE

```
<?xml version="1.0" encoding="UTF-8" ?>
<queryDescriptor alias="AffinityPerCategory" >
    <defineParameter
        localname="whichCategory"
        requestParameter="category"
        defaultValue="Home"
    />
    <query>
        <data>
            <queryComponent
                value="select cast(E.entityname as varchar(50)),
cast(substr(E.entityname, length('"
            />
            <useParameter
                value="whichCategory" />
            <queryComponent
                value="')+1, length(E.entityname)-length('"
            />
            <useParameter
                value="whichCategory" />
            <queryComponent
                value="')+1) as varchar(50)) , decimal((select
sum(M.value) from lotusrds.metrics M, lotusrds.registry R,
lotusrds.entity E2 where M.metricid = R.metricid and
R.metricname = 'AFFINITY' and M.value > 0 and E2.entityid =
M.entityid1 and substr(E2.entityname,1,
length(E.entityname)) = cast(E.entityname as
varchar(50))),8,4) as aff_sum from lotusrds.entity E where
E.entityname in (select E3.entityname from lotusrds.entity
E3 where E3.entityname like '"
            />
            <useParameter
                value="whichCategory" />
            <queryComponent
                value=">%'"
            />
            <queryAsFullyQualified
                parameter="whichCategory"
                prefix="and E3.entityname not like '"
                suffix=">%>%'" />
            <queryComponent
                value="') order by aff_sum DESC, E.entityname"
            />
        </data>
    </query>
</queryDescriptor>
```

When a user at client browser 24 selects a metric to visualize, the name of an XML document is passed as a parameter in HTTP request 23 to servlet 34 as follows:

<input type=hidden name="queryAlias" value="AffinityPerCategory">

In some cases, there is a need to utilize another method for extracting data from the data source 32 through the use of a generator Java bean. The name of this generator bean is passed as a parameter in HTTP request 23 to servlet 34 as follows:

<input type=hidden name="queryAlias" value="PeopleInCommonByCommGenerator">

Once servlet 34 receives the XML document name or the appropriate generator bean reference at request handler 40, query engine 42 filters, processes, and executes query 21. Once query 21 is executed, data returned from metrics database 32 on line 21 is normalized by query engine 42 into an XML format 43 that can be intelligently processed by an XSL stylesheet 52 further on in the process.

Figure 5:
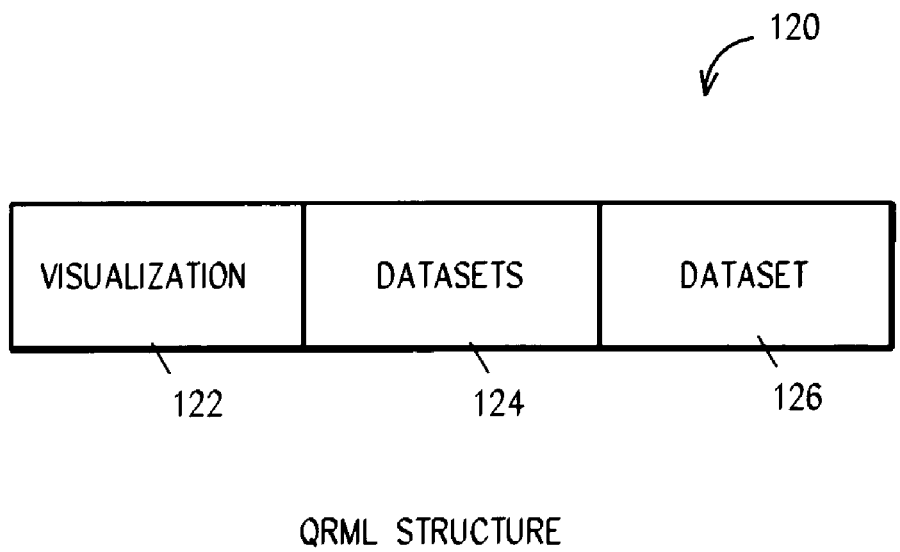
FIG. 5 is a diagrammatic representation of a normalized XML format, or result set QRML.

Referring to FIG. 5, the response back to web application server 22 placed on line 21 is classified as a Query Response Markup Language (QRML) 120. QRML 120 is composed of three main elements. They are <visualization> 122, <datasets> 124, and <dataset> 126. QRML structure 120 describes XML query descriptions 48 and the construction of a result set XML on line 43.

The <visualization> element 122 represents the root of the XML document 43 and provides an alias attribute to describe the tool used for visualization, such as a chart applet, for response 25.

The <datasets> element 124 wraps one or more <dataset> collections depending on whether multiple query executions are used.

The <dataset> element 126 is composed of a child node <member> that contains an attribute to index each row of returned data. To wrap the raw data itself, the <member> element has a child node <elem> to correspond to column data.

Table 2 illustrates an example of this normalized XML, or QRML, structure.

TABLE 2

NORMALIZED XML STRUCTURE EXAMPLE (QRML)

```
<visualization>
    <datasets>
        <dataset>
            <member index="1">
                <elem>25</elem>
                <elem>36</elem>
                . . .
            </member>
            <member index="2">
                <elem>26</elem>
                <elem>47</elem>
                . . .
            </member>
            . . .
        </dataset>
    </datasets>
</visualization>
```

Data Translation and Visualization

Referring further to FIG. 3, for data translation and visualization, in accordance with the architecture of an exemplary embodiment of the invention, an effective delineation between the visual components (interface) and the data extraction layers (implementation) is provided by visualization engine 44 receiving notification from query engine 42 and commanding how the user interface response on line 25 should be constructed or appear. In order to glue the interface to the implementation, embedded JSP scripting logic 50 is used to generate the visualizations on the client side 25. This process is two-fold. Once servlet 34 extracts and normalizes the data source 32 into the appropriate XML structure 43, the resulting document node is then dispatched to the receiving JSP 50. Essentially, all of the data packaging is performed before it reaches the client side 25 for visualization. The page is selected by the value parameter of a user HTTP request, which is an identifier for the appropriate JSP file 50. Layout pages 50 receive the result set XML 120 on line 43, and once received an XSL transform takes effect that executes a transformation to produce parameters necessary to launch the visualization.

For a visualization to occur at client 24, a specific set of parameters needs to be passed to the chart applet provided by, for example, Visual Mining's Netcharts solution. XSL transformation 52 generates the necessary Chart Definition Language (CDLs) parameters, a format used to specify data parameters and chart properties. Other visualizations may involve only HTML (for example, as when a table of information is displayed.)

Table 3 illustrates an example of CDL defined parameters as generated by XSL transforms 52 and fed to client 24 on line 25 from visualization engine 44.

TABLE 3

CHART DEFINITION LANGUAGE EXAMPLE

```
DebugSet = LICENSE;
Background = (white, NONE, 0);
Bar3DDepth = 15;
LeftTics    = ("ON", black, "Helvetica", 11);
LeftFormat  = (INTEGER);
LeftTitle   = ("Recency Level", x758EC5, helvetica,
12, 270);
BottomTics = ("OFF", black, "Helvetica", 11, 0);
Grid       = (lightgray, white, black), (xCCCCCC,
null, null);
GridLine = (HORIZONTAL, DOTTED, 1), (HORIZONTAL,
SOLID,
1);
GridAxis = (TOP, LEFT), (BOTTOM, LEFT);
GraphLayout = VERTICAL;
Footer     = ("Categories", x758EC5, helvetica, 12,
0);
Header     = ("Category Recency", black, helvetica,
18, 0);
DwellLabel  = ("", black, "Helvetica", 10);
DwellBox = (xe3e3e3, SHADOW, 2);
BarLabels = "Uncategorized Documents", "Domino.Doc",
"Portals", "Industry News and Analysis", "Cross-product",
"Technologies", "Discovery Server", "Other Products",
"Domino Workflow";
ColorTable = xDDFFDD, xDDFFDD, xDDFFDD, xDDFFDD,
xDDFFDD, xDDFFDD, xDDFFDD, xDDFFDD, xDDFFDD;
DataSets = ("Last Modified Date");
DataSet1 = 45, 29, 23, 17, 10, 10, 9, 9, 0;
ActiveLabels1 = ("Home>Uncategorized Documents"),
("Home>Domino.Doc"), ("Home>Portals"), ("Home>Industry News
and Analysis"), ("Home>Cross-product"),
("Home>Technologies"), ("Home>Discovery Server"),
("Home>Other Products"), ("Home>Domino Workflow");
```

An XSL stylesheet (or transform) 52 is used to translate the QRML document on line 43 into the specific CDL format shown above on line 25. Table 4 illustrates an example of how an XSL stylesheet 52 defines the translation.

TABLE 4

XSL STYLESHEET TRANSLATION EXAMPLE

```
<?xml version="1.0"?>
<xsl:stylesheet
    version="1.0"
    xmlns:xsl="http://www.w3.org/1999/XSL/Transform"
>
<xsl:output method='text' />
    <!--Visualization type: bar chart representation-->
    <!--Category Lifespan-->
    <xsl:template match="/">
        <xsl:apply-templates />
    </xsl:template>
    <xsl:template match="datasets">
        DebugSet = LICENSE;
```

TABLE 4-continued

XSL STYLESHEET TRANSLATION EXAMPLE

```
    Background   = (white, NONE, 0);
    Bar3DDepth = 15;
    LeftTics    = ("ON", black, "Helvetica", 11);
    LeftFormat  = (INTEGER);
    LeftTitle   = ("Recency Level", x758EC5, helvetica,
12, 270);
    BottomTics = ("OFF", black, "Helvetica", 11, 0);
    Grid       = (lightgray, white, black), (xCCCCCC,
null, null);
    GridLine = (HORIZONTAL, DOTTED, 1), (HORIZONTAL,
SOLID,
1);
    GridAxis = (TOP, LEFT), (BOTTOM, LEFT);
    GraphLayout = VERTICAL;
    Footer     = ("Categories", x758EC5, helvetica, 12,
0);
    Header     = ("Category Recency", black, helvetica,
18, 0);
    DwellLabel  = ("", black, "Helvetica", 10);
    DwellBox = (xe3e3e3, SHADOW, 2);
        <xsl:apply-templates />
    </xsl:template>
    <xsl:template match="dataset">
        BarLabels = <xsl:for-each select="member"><xsl:value-
of select="elem[3]"/>"<xsl:if
test="not(position( )=last( ))">, </xsl:if></xsl:for-each>;
        ColorTable = <xsl:for-each
select="member">xDDFFDD<xsl:if
test="not(position( )=last( ))">, </xsl:if></xsl:for-each>;
        DataSets = ("Last Modified Date");
        <xsl:variable name="count" select="1"/>
        DataSet<xsl:value-of select="$count"/> = <xsl:for-each
select="member"><xsl:value-of select="elem[1]"/><xsl:if
test="not(position( )=last( ))">, </xsl:if></xsl:for-each>;
        ActiveLabels<xsl:value-of select="$count"/> =
<xsl:for-each select="member">("<xsl:value-of
select="elem[2]"/>")<xsl:if test="not(position( )=last( ))">,
</xsl:if></xsl:for-each>;
    </xsl:template>
</xsl:stylesheet>
```

This process of data retrieval, binding, and translation all occur within a JSP page 50. Table 5 shows an example JSP. Here an XSLTBean opens an XSL file 52 and applies it to the XML 43 that represents the results of the SQL query. (This XML is retrieved by calling queryResp.getDocumentElement( )). The final result of executing this JSP 50 is that a HTML page 25 is sent to browser 24. This HTML page will include, if necessary, a tag that runs a charting applet (and provides that applet with the parameters and data it needs to display correctly). In simple cases, the HTML page includes only HTML tags (for example, as in the case where a simple table is displayed at browser 24). This use of XSL and XML within a JSP is a well-known Java development practice.

TABLE 5

VISUALIZATION PARAMETERS GENERATION EXAMPLE

```
<%@ page language="java" autoFlush="false"
    import="com.ibm.raven.*, com.ibm.raven.applets.beans.*,
org.w3c.dom.*, javax.xml.*, javax.xml.transform.stream.*,
javax.xml.transform.dom.*, java.io.*, javax.xml.transform.*"
    buffer="500kb"%>
<%
    //retrieve the pre-packaged bean dispatched from
ExtremeVisualizer servlet
    Document queryResp = (Document)
request.getAttribute("visualization");
    //retrieve parameters dispatched from the servlet
    String queryAlias = request.getparameter("queryAlias");
    String fullyQualified =
```

TABLE 5-continued

VISUALIZATION PARAMETERS GENERATION EXAMPLE

```
request.getParameter("fullyQualified");
    //query to use
    String query;
%>
<APPLET NAME=barchart
        CODEBASE=/Netcharts/classes
        ARCHIVE=netcharts.jar
        CODE=NFBarchartApp.class
        WIDTH=420 HEIGHT=350>
<PARAM NAME=NFParamScript VALUE = '
<%
            try
            {
            query = (fullyQualified != null) ? queryAlias +
"_ : flat" queryAlias;
                    XSLTBean xslt = new
XSLTBean(getServletContext( ) .getRealPath("/visualizations/xsl/
visualization_" + query + ".xsl"));
                    xslt.translate( new
javax.xml.transform.dom.DOMSource(queryResp.
getDocumentElement( )),
new javax.xml.transform.stream.StreamResult(out));
            }
            catch(Exception e)
            {
                out.println("XSL Processing Error");
            e.printStackTrace(out);
            }
%>
'>
</applet>
```

Table 6 is an example SQL query as issued by Servlet 34.

TABLE 6

Example SQL Query

```
select doctitle, decimal(M.value,16, 4) \
from lotusrds.metrics M \
join lotusrds.registry R on (R.metricid = M.metricid and
R.metricname = 'DOCVALUE') \
join lotusrds.entity E3 on (E3.entityaliasid = M.entityid1
and E3.entityaclass=1) \
join lotusrds.docmeta D on D.docid = E3.entityname \
join lotusrds.cluster_docs CD on CD.docid = D.docid \
join lotusrds.entity E1 on E1.entityname = CD.clid \
join lotusrds.entity E2 on E2.entityid = E1.entityaliasid \
where E2.entityname like 'Home>Discovery Server>Spiders%' \
order by docmetricvalue DESC, doctitle
```

This example returns the titles of documents that are contained by the category "Home->Discovery Server->Spiders", as well as in any subcategories of "Spiders". The query results are sorted by document value, from highest to lowest value. The name of the category ("Home->Discovery Server->Spiders" in the example) is taken from a parameter in Request Header 40 by Servlet 34, and then used by Servlet 34 in constructing dynamic SQL queries 22. Referring to FIG. 4, the category name is an example of a <defineParameter> element 114.

The example query draws on data contained in a number of database tables that are maintained by the Discovery Server. The METRICS table is where all of the metrics are stored, and this query is interested in only the DOCVALUE metric. The REGISTRY table defines the types of metrics that are collected, and is used here to filter out all metrics except the DOCVALUE metric. Records in the METRICS table use identifiers rather than document titles to identify documents. Since the example query outputs document titles, it is necessary to convert document ids to titles. The document titles are stored in the DOCMETA table, and so the document title is extracted by joining the METRICS table to the ENTITY table (to get the document id) and then doing an additional join to DOCMETA (to get the document title).

In order to select documents that belong to a particular category, the categories to which the document belongs also need to be obtained. This information is stored in the CLUSTER_DOCS table, and so the join to CLUSTER_DOCS makes category ids available. These category ids are transformed to category names through additional joins to the ENTITY table.

An exemplary embodiment of the system and method of the invention may be built using the Java programming language on the Jakarta Tomcat platform (v3.2.3) using the Model-View-Controller (MVC) (also known as Model 2) architecture to separate the data model from the view mechanism.

Identifying and Visualizing Founders

In accordance with the preferred embodiment of the invention, usage patterns within an information aggregate (a collection of documents having non-unique values on a shared attribute) are analyzed to identify the founders of the aggregate. These founders are the people who first created information that was eventually collected into the aggregate. Such people are likely to be forward thinkers who might have valuable insights about industry trends (as well as other topics), and are therefore people who could be interesting to contact. They are good candidates to add to an individuals network of contacts.

Figure 6:
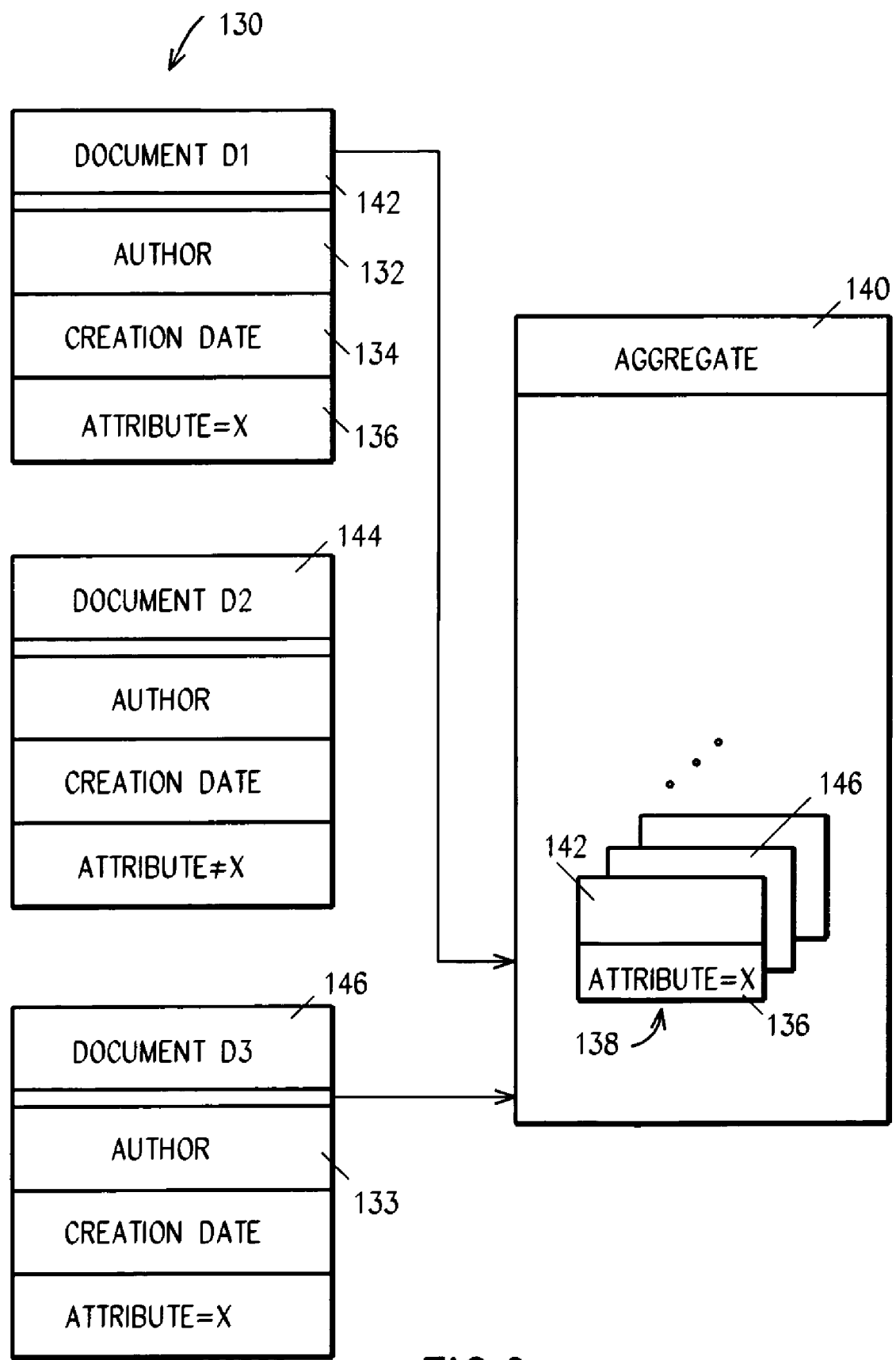
FIG. 6 is a diagrammatic representation of an aggregate in accordance with the preferred embodiment of the invention.

Referring to FIG. 6, a system in accordance with the present invention contains documents 130 such as Web pages, records in Notes databases, and e-mails. Each document 130 is associated with its author 132, and the date of its creation 134. A collection of selected documents 130 forms an aggregates 140. An aggregate 140 is a collection 138 of documents 142, 146 having a shared attribute 136 having non-unique values. Documents 138 can be aggregated by attributes 136 such as:

Category—a collection of documents 130 about a specific topic.

Community—a collection of documents 130 of interest to a given group of people.

Location—a collection of documents 130 authored by people in a geographic location (e.g. USA, Massachusetts, Europe).

Job function or role—a collection of documents 130 authored by people in particular job roles (e.g. Marketing, Development).

Group (where group is a list of people)—a collection of documents authored by a given set of people.

Any other attributed 136 shared by a group (and having non-unique values).

Figure 7:
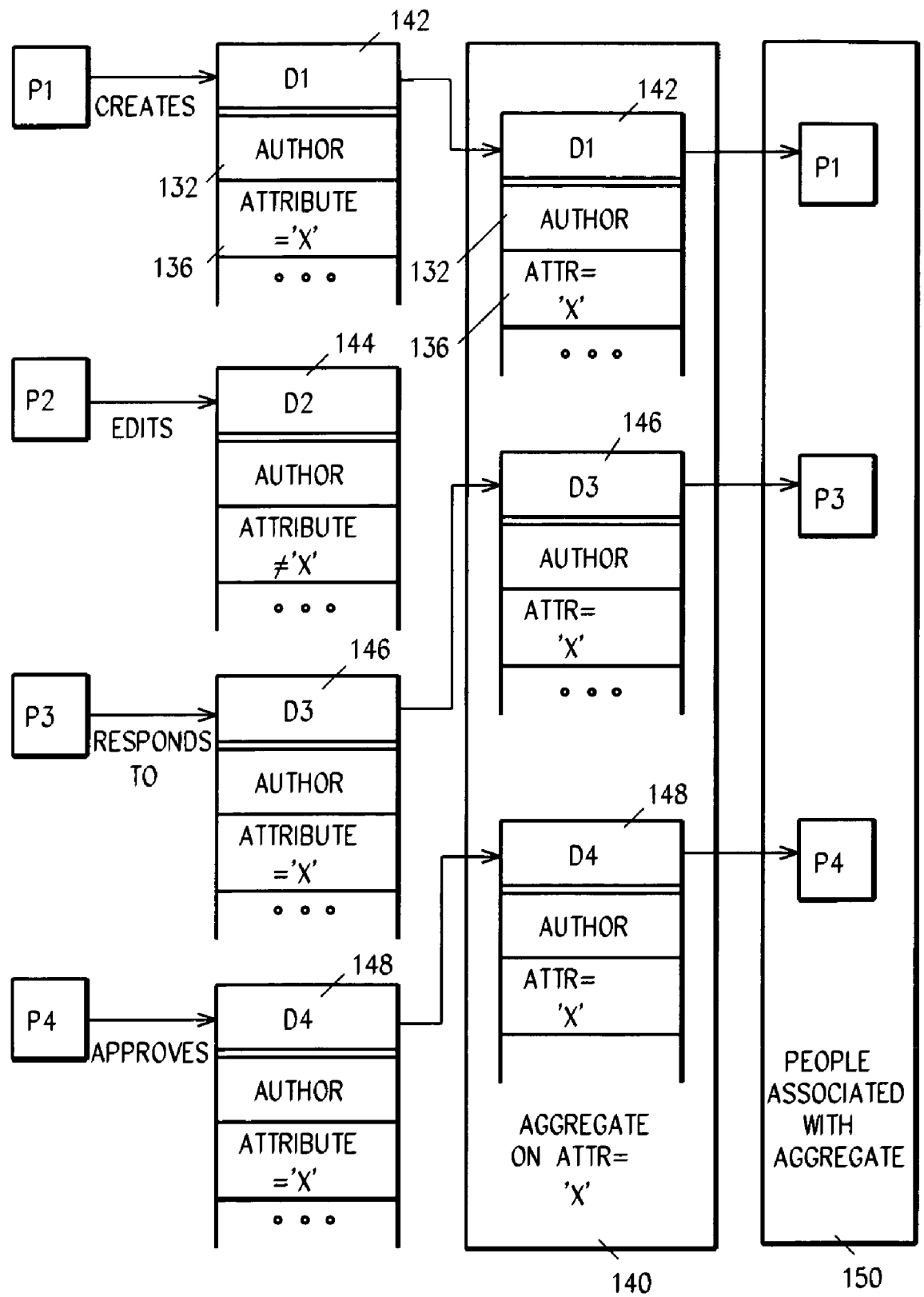
FIG. 7 is a diagrammatic illustration of people associated with an aggregate.

Referring to FIG. 7, person P1 is associated with document 142 as its creator, person P2 is associated with document 144 as its editor, person P3 is associated with document 146 as a responder, and person P4 is associated with document 148 as its approver. Aggregate 140 on attribute X includes documents 142, 146, and 148, and therefore people 150 associated with aggregate 140 include persons P1, P3 and P4.

Figure 8:
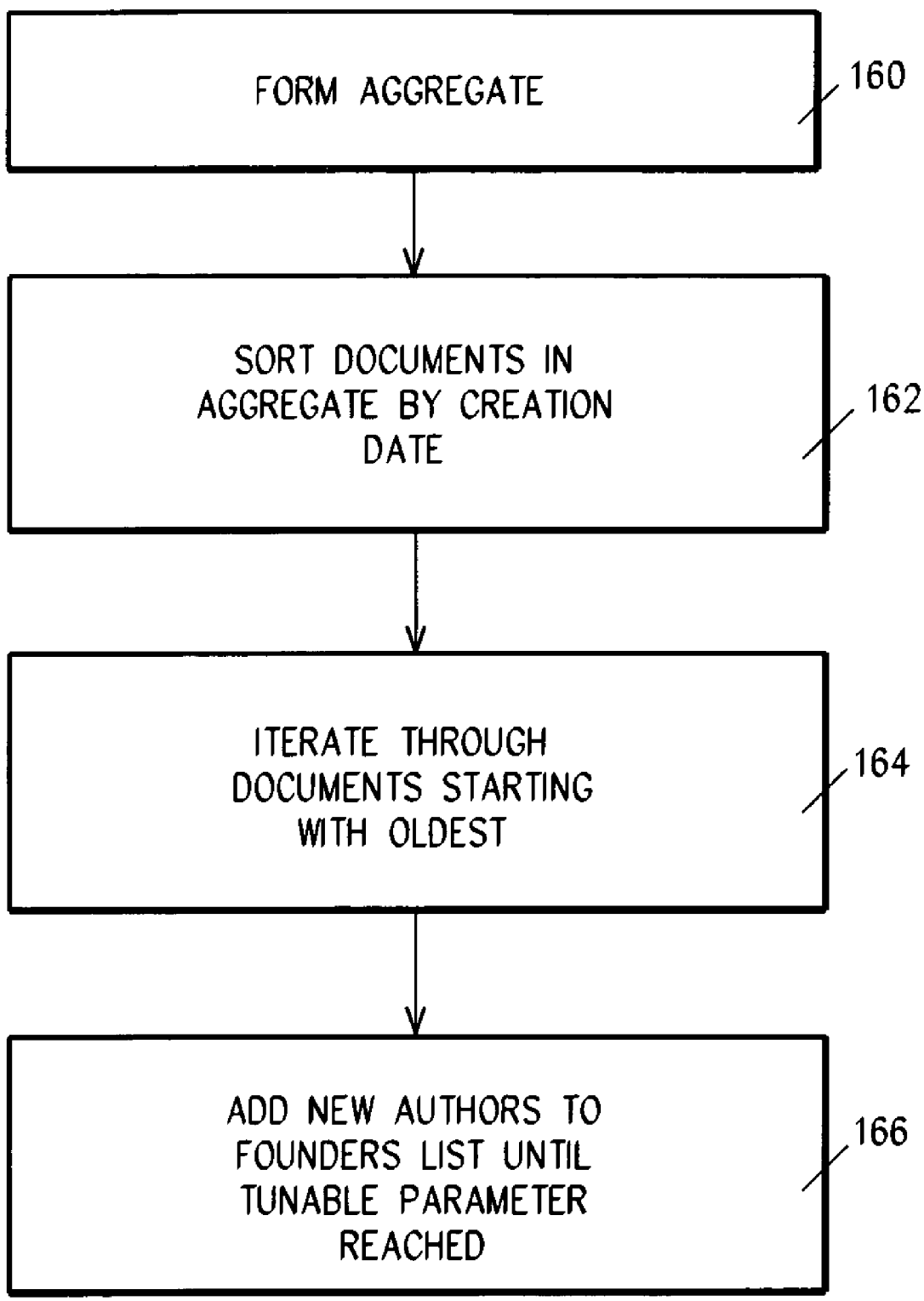
FIG. 8 is a flow chart representation of an exemplary embodiment of the method of the invention for creating a list of founders.

Referring to FIG. 8, in accordance with an exemplary embodiment of the method of the invention, the founders (or founding authors) of an information aggregate 140 are selected as follows:

In step 160, documents 130 are formed into an aggregate 140 of documents 138 having a common attribute 136.

In step 162, documents 138 are sorted by their creation dates 134.

In step 164, documents 138 are examined (iterating, starting with the oldest), to find the document's author 132.

In step 166, the author 132 of the document being examined is added to a list of founders, until N different authors 132 have been found (where N is a tunable parameter). For example, where N=5, steps 166 and 170 iterate until the first five different people to have created documents 138 in aggregate 140 have been found and identified as founders of the aggregate.

In an alternative embodiment of the invention, founders may be selected from among people 150 associated with aggregate 140, and not just their authors, again as those persons P1, P3, and/or P4 having specific associations (create, edit, respond to and/or approve) with documents in aggregate 140.

There are a number of additional, alternative embodiments of the method of the invention, including the following. The founders are identified by looking at the documents within a fixed time period. After identifying the date of creation of the first document of the aggregate, individuals creating documents within, say, 30 days of the date of the first document are identified as founding authors. Similarly, if the information aggregate has a creation date, individuals creating documents within 30 days of the creation date of the aggregate are identified as founders. For example, in a system where documents are organized by category, the creation date of the category is used as the start of the time period to be analyzed. Also, weighting factors can be applied to rank the degree of "foundership". For example: more credit is to the first person to create a document in the aggregate, rather than treat all people equally (such as those which edit, respond to or approve). Also, document activity within the aggregate, over the analysis time period, can be used to give more weight to the active founders. For example, such activity in a threaded discussion database, may include responses or modifications to existing documents, or documents that contain links to documents in the aggregate, or reads of existing documents. In these alternative embodiments, people who create more documents or respond more often over the time period of analysis are given a higher "founders" rating.

In accordance with a further embodiment of the method of the invention, system-wide rankings of founders are created in situations where collections of aggregates exist. For example, where documents are organized into categories, a sum of founder credits across all categories is generated, and the results displayed in a single list of people. Such a system-wide list represents people who are consistently among the first to write about particular topics, and so it would be interesting to talk to those people because what they are working on today might well be important to a corporation in the future.

Advantages

It is, therefore, an advantage of the invention that there is provided an improved system and method finding people with particular expertise.

It is a further advantage of the invention that there is provided an improved system and method finding people with broad expertise.

It is a further advantage of the invention that there is provided a system and method for finding people who are associated with an information aggregate, so that people looking at an aggregate can quickly find people who might be able to answer questions about the aggregate and what it represents.

Alternative Embodiments

It will be appreciated that, although specific embodiments of the invention have been described herein for purposes of illustration, various modifications may be made without departing from the spirit and scope of the invention. In particular, it is within the scope of the invention to provide a computer program product or program element, or a program storage or memory device, magnetic or optical wire, tape or disc, or the like, for storing signals readable by a machine, for controlling the operation of a computer according to the method of the invention and/or to structure its components in accordance with the system of the invention.

Further, each step of the method may be executed on any general computer, such as IBM Systems designated as zSeries, iSeries, xSeries, and pSeries, or the like and pursuant to one or more, or a part of one or more, program elements, modules or objects generated from any programming language, such as C++, Java, Pl/1, Fortran or the like. And still further, each said step, or a file or object or the like implementing each said step, may be executed by special purpose hardware or a circuit module designed for that purpose.

Accordingly, the scope of protection of this invention is limited only by the following claims and their equivalents.

We claim:

1. A computer implemented method executed by a knowledge management computing device for evaluating a plurality of document collections, comprising:

providing a plurality of documents in a documents database in computer storage;

collecting, by the knowledge management computing device, from said documents database a plurality of document collections, each said document collection being a subset of said plurality of documents having non-unique values on a shared attribute;

identifying, by the knowledge management computing device, one or more founders of said plurality of document collections by rating one or more individuals associated earliest with one or more documents of said plurality of document collections, wherein the rating is based on a frequency of workflow actions of the one or more individuals, performed on the plurality of documents, evaluated over a fixed time period following a creation of a first created document of said one or more documents, wherein the workflow actions include editing, responding to, creating, and approving one or more of said one or more documents previously created and authored by another individual;

adding the one or more founders to a list of founders until a number of founders are in the list, the number of founders being a tunable parameter;

applying weighting factors to the one or more founders to determine a degree of foundership;

ranking the one or more founders based upon, at least in part, the degree of foundership; and displaying said list of one or more founders on a computer display apparatus.

2. The method of claim 1, wherein identifying one or more founders includes identifying the one or more individuals as first users of oldest documents contained in a specific document collection.

3. The method of claim 2 wherein said rating of one or more founders is further based on a quantity of documents created.

4. The method of claim 1, wherein said one or more founders are identified as category creators and as contributors associated with a category, wherein the category is a collection of knowledge resources of similar content associated with at least one of the plurality of document collections.

5. The computer implemented method of claim 1, wherein at least one of the one or more founders first created information that was eventually added to the plurality of documents.

6. The computer implemented method of claim 1 wherein at least one of the weighting factors includes activity in a threaded discussion database.

7. The computer implemented method of claim 6 wherein the activity includes responses to at least one of the plurality of documents.

8. The computer implemented method of claim 6 wherein the activity includes modifications to at least one of the plurality of documents.

9. A knowledge management computing system comprising:
- a computer storage coupled to a database computing device for storing a plurality of documents in a documents database;
- a plurality of document collections collected from said documents database by a query engine executed by an application server device, each said document collection being a subset of said plurality of documents having non-unique values on a shared attribute;
- a founder identification feature of the query engine that identifies one or more founders of said plurality of document collections by:
  - rating one or more individuals first associated with one or more documents of said plurality of document collections, wherein the rating is based on a frequency of workflow actions of the individual, performed on the plurality of documents, evaluated over a fixed period of time following a creation of a first created document of said one or more documents, wherein the workflow actions include editing, responding to, creating, and approving said one or more documents of said plurality of document collections authored by another individual;
  - adding the one or more founders to a list of founders until a number of founders are in the list, the number of founders being a tunable parameter;
  - applying weighting factors to the one or more founders to determine a degree of foundership;
  - ranking the one or more founders based upon, at least in part, the degree of foundership; and
- a visualization engine executed by a client computing device to display said list of one or more founders on a client display apparatus.

10. The system of claim 9 wherein said one or more founders are identified category creators associated with a category, wherein the category is a collection of knowledge resources of similar content associated with at least one of the plurality of document collections.

11. The knowledge management computing system of claim 9, wherein at least one of the one or more founders first created information that was eventually added to the plurality of documents.

12. The method of claim 9 wherein at least one of the weighting factors includes activity in a threaded discussion database.

13. The method of claim 12 wherein the activity includes responses to at least one of the plurality of documents.

14. The method of claim 12 wherein the activity includes modifications to at least one of the plurality of documents.

15. A computer program product for evaluating a plurality of document collections, said computer program product comprising:
- a computer readable medium;
- first program instructions to provide a plurality of documents in a documents database;
- second program instructions to collect from said documents database said plurality of document collections, each document collection of said plurality of document collections being a subset of said plurality of documents having non-unique values on a shared attribute;
- third program instructions to identify one or more founders of said plurality of document collections by rating one or more individuals associated earliest with one or more documents of said plurality of document collections, wherein the rating is based on a frequency of workflow actions of the one or more individuals, performed on the plurality of documents, evaluated over a fixed time period following a creation of a first created document of said one or more documents, wherein the workflow actions include editing, responding to, creating, and approving said one or more documents contained in a specific document collection authored by another individual;
- fourth program instructions to add the one or more founders to a list of founders until a number of founders are in the list, the number of founders being a tunable parameter;
- fifth program instructions to apply weighting factors to the one or more founders to determine a degree of foundership;
- sixth program instructions to rank the one or more founders based upon, at least in part, the degree of foundership;
- seventh program instructions to display said list of one or more founders on a computer display apparatus; and
- wherein said first, second, third, fourth, fifth, sixth, and seventh program instructions are recorded on said computer readable medium.

16. The computer program product of claim 15, further comprising:
- eighth program instructions to identify one or more specific founders of a specific document collection of said plurality of document collections by rating one or more specific individuals associated with one or more documents of said specific document collection, wherein the rating is based on a frequency of workflow actions of the one or more specific individuals evaluated over a fixed time period following a creation of a first created document of said one or more documents of said specific document collection, wherein the workflow actions include editing, responding to, creating, and approving oldest documents contained in said specific document collection; and wherein
- said eighth program instructions are recorded on said computer readable medium.

17. The computer program product of claim 15 wherein the rating is further based upon a quantity of documents created.

18. The computer program product of claim 17, further comprising:
- ninth program instructions to generate a sum of one or more ratings across all document collections of a given category and to visualize in a single list the one or more individuals having highest ratings; and
- wherein said ninth program instructions are recorded on said computer readable medium.

* * * * *